(12) United States Patent
Marquez et al.

(10) Patent No.: US 10,501,206 B2
(45) Date of Patent: Dec. 10, 2019

(54) RUNWAY LIGHTING

(71) Applicant: Honeywell International Inc., Morris Plains, NJ (US)

(72) Inventors: Jose Francisco Marquez, Mexicali (MX); Oscar Alvarez, Mexicali (MX); Todd Langston, Chandler, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/832,167

(22) Filed: Dec. 5, 2017

(65) Prior Publication Data

US 2018/0162554 A1 Jun. 14, 2018

Related U.S. Application Data

(60) Provisional application No. 62/431,646, filed on Dec. 8, 2016.

(51) Int. Cl.
| | | |
|---|---|---|
| *F21V 17/18* | (2006.01) | |
| *F21S 8/02* | (2006.01) | |
| *B64F 1/20* | (2006.01) | |
| *F21S 8/00* | (2006.01) | |
| *F21V 15/01* | (2006.01) | |
| *F21W 111/06* | (2006.01) | |

(52) U.S. Cl.
CPC .............. *B64F 1/20* (2013.01); *B64F 1/205* (2013.01); *F21S 8/022* (2013.01); *F21S 8/032* (2013.01); *F21V 15/01* (2013.01); *F21W 2111/06* (2013.01)

(58) Field of Classification Search
CPC ... B64F 1/20; B64F 1/205; F21S 8/022; F21S 8/032

USPC ....................................................... 362/153.1
See application file for complete search history.

(56) References Cited

U.S. PATENT DOCUMENTS

| | | | |
|---|---|---|---|
| 2,854,274 A | 9/1958 | Gordon | |
| 3,113,726 A | 12/1963 | Pennow et al. | |
| 4,860,182 A | 8/1989 | Vadseth | |
| 6,669,351 B1 * | 12/2003 | Shea | B64F 1/20 |
| | | | 362/153.1 |
| 6,796,153 B2 | 9/2004 | Ochi | |
| 6,929,226 B1 | 8/2005 | Philistine | |
| 7,097,215 B2 | 8/2006 | Chen | |

(Continued)

FOREIGN PATENT DOCUMENTS

| | | |
|---|---|---|
| DE | 20203550 U1 | 7/2002 |
| EP | 3078531 A1 | 10/2016 |

(Continued)

OTHER PUBLICATIONS

Extended Search Report and Opinion from related European Application No. 17204765.6 dated Feb. 6, 2018 (10 pages).

(Continued)

*Primary Examiner* — Daniel A Hess
(74) *Attorney, Agent, or Firm* — Brooks, Cameron & Huebsch, PLLC (57) ABSTRACT

Devices, methods, and systems for runway lighting are described herein. One device includes a top portion, including a plurality of light emitting elements and a plurality of lateral protrusions, and a base portion including a plurality of surfaces defining a plurality of slots, wherein each slot is configured to receive one of the plurality of lateral protrusions to secure the top portion to the base portion.

14 Claims, 6 Drawing Sheets

(56) References Cited

U.S. PATENT DOCUMENTS

| | | | |
|---|---|---|---|
| 9,853,413 B2* | 12/2017 | Kim | H01S 5/005 |
| 2002/0126476 A1* | 9/2002 | Reinert, Sr. | B64F 1/20 |
| | | | 362/153.1 |
| 2011/0285292 A1* | 11/2011 | Mollnow | F21S 10/02 |
| | | | 315/113 |
| 2016/0281965 A1* | 9/2016 | Schneider | F21S 8/022 |

FOREIGN PATENT DOCUMENTS

| | | |
|---|---|---|
| WO | 2005108802 A1 | 11/2005 |
| WO | 2014111541 A1 | 7/2014 |

OTHER PUBLICATIONS

Communication Pursuant to Article 94(3) EPC from related European Patent Application No. 17204765.6, dated Sep. 3, 2018, 4 pages.

Instruction Manual, Eaton Crouse-Hinds Series, http://www.cooperindustries.com/content/dam/public/crousehinds/airport-lighting/product-manuals/9929.pdf, Jul. 13, 2016, 23 pages.

* cited by examiner

RUNWAY LIGHTING

PRIORITY INFORMATION

This application claims the benefit of U.S. Provisional Application No. 62/431,646, filed Dec. 8, 2016, the contents of which are incorporated herein by reference.

TECHNICAL FIELD

The present disclosure relates to devices and systems for runway lighting.

BACKGROUND

Lighting may be installed in runways to provide improved aircraft landing and/or takeoff in low-visibility conditions. Previous approaches to runway lighting may use a light assembled onto a base using a combination of inserts and/or fasteners, such as hex head bolts. However, vibrations, aircraft tire loads, and/or vacuums created by passing aircraft may loosen these components. The bolts and other portions of previous light assemblies may consequently become risks of foreign object damage (FOD).

In order to prevent lighting-related FOD to aircraft, runways may be periodically closed to allow for re-torquing and/or replacing of the fasteners of previous approaches. Closure of runways results in time delays, the costs of which may be onerous.

DETAILED DESCRIPTION

Devices and systems for runway lighting are described herein. In contrast with previous approaches, embodiments of the present disclosure can include a runway lighting apparatus (sometimes referred to herein simply as a "device") that is not secured by means of screws or other tightened fasteners. In some embodiments, for instance, the device can be comprised of a top portion and a base portion configured to receive the top portion.

The top portion can include one or more lateral protrusions (referred to herein as "keys") that can slide into corresponding slots in the base portion. Once the keys are inserted downward through a vertical portion of the slots, the top portion can be rotated, and the keys can slide through a horizontal portion of the slots, until a securing mechanism (e.g., a spring-loaded pin) in the base portion engages a corresponding opening in the top portion. Thus, the top portion and the base portion can be secured together such that movement between the two is prevented in all directions.

The base portion can be secured below a runway surface. In some embodiments, the base portion can be embedded in concrete and can be fixed. The top portion can be removed by disengaging the securing mechanism (e.g., depressing the pin through the opening) and rotating the top portion in the reverse direction such that the keys slide back through the horizontal portion of the slots in the base into the vertical portion of the slots. In some embodiments, a tool such as a screwdriver can be used to depress the pin. In some embodiments, rotation of the top portion can be performed with the use of a tool such as a wrench (e.g., a socket wrench).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure. As used herein, "a" or "a number of" something can refer to one or more such things. For example, "a number of blocks" can refer to one or more blocks.

FIGS. 1-5 illustrate different views of a lighting apparatus (device) in accordance with the present disclosure. It is noted that lighting apparatuses in accordance with embodiments herein are not limited to the example shown in FIGS. 1-5. As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

Figure 1:
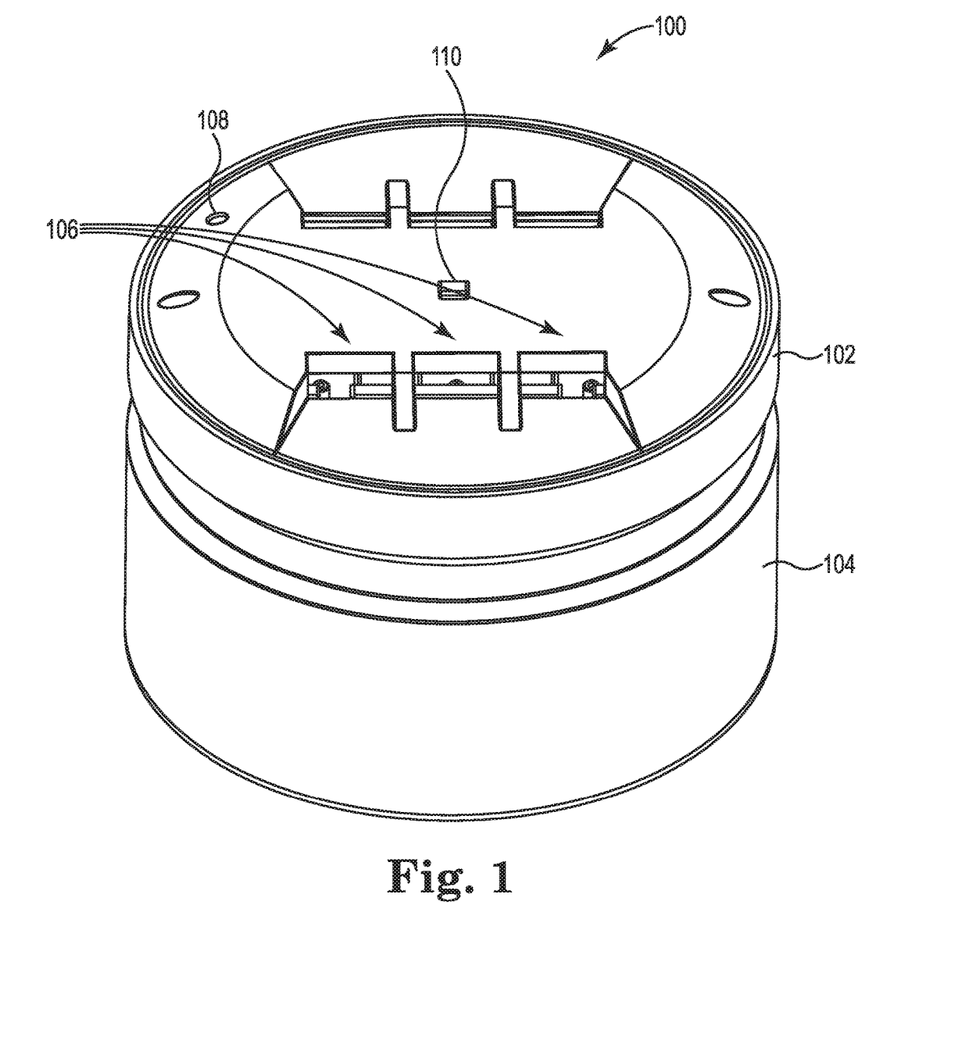
FIG. 1 illustrates a runway lighting apparatus in accordance with one or more embodiments of the present disclosure.

As shown in FIG. 1, for instance, the device 100 can be generally cylindrical in shape and can include a top portion 102 (hereinafter "top 102") and a base portion 104 (hereinafter "base 104"). Visible on the exterior surfaces of the device 100 are a number of light emitting elements 106, a tool receiver 110 (hereinafter "socket 110"), and an opening 108 (hereinafter "pin hole 108").

The top 102 and/or the base 104 can be made of metal, for instance, such as stainless steel. It is to be appreciated that other materials may be used. The light emitting elements 106 can include bulbs, diodes, and/or other lighting devices, and are not intended to be limited herein to a particular type and/or number of light emitting element. The base 104 can be embedded in a runway, for instance (e.g., concrete). In some embodiments, the base 104 is located entirely below a surface of a runway. In some embodiments, the base 104 can include an anchoring feature to allow for improved securing in the runway (not shown in FIGS. 1-5). For example, in some embodiments, a bottom portion of the base 104 can include a bulbous end and/or an hourglass shape. The top 102 can extend above the surface of the runway by a particular amount (e.g., to a maximum of 6.3 millimeters).

Figure 2:
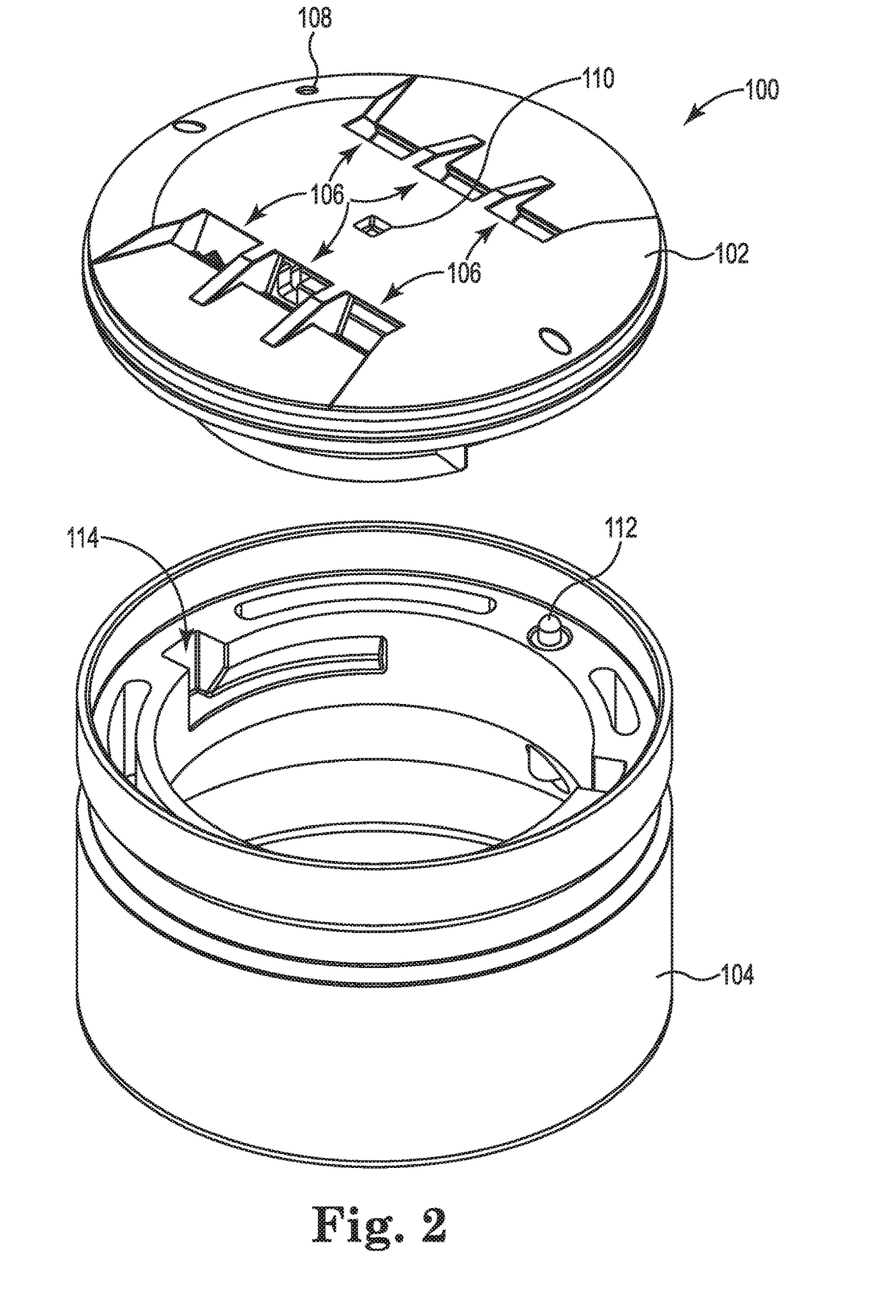
FIG. 2 illustrates a top portion and a base portion of the runway lighting apparatus in accordance with one or more embodiments of the present disclosure.
Figure 3:
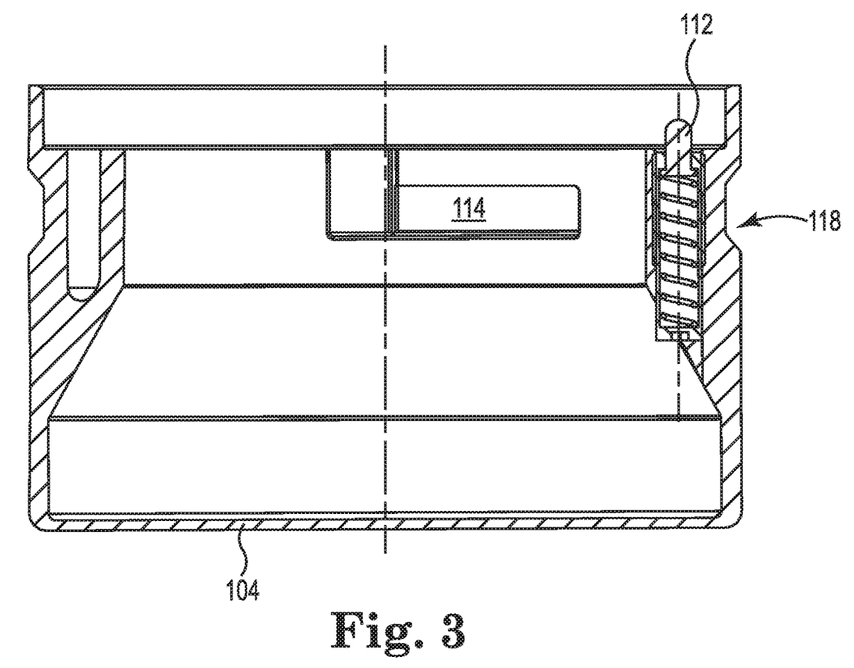
FIG. 3 illustrates a cross-sectional view of the base portion of the runway lighting apparatus in accordance with one or more embodiments of the present disclosure.

As shown in FIG. 2, for instance, the top 102 can be detached from the base 104. As seen on the interior of the base 104, the base 104 can include a number of surfaces defining a number of slots 114. Each of the slots 114 can include a vertical portion and an adjoining horizontal portion. The slots can be sized to accommodate keys 116 of the top 102 (seen in FIG. 4), for instance. Also shown in FIG. 2, the base can include a spring-loaded pin 112 extending vertically upward. The pin 112 can be biased in a raised position by a spring 118, shown in FIG. 3, such that the pin 112 protrudes from an interior surface of the base 104.

Figure 4:
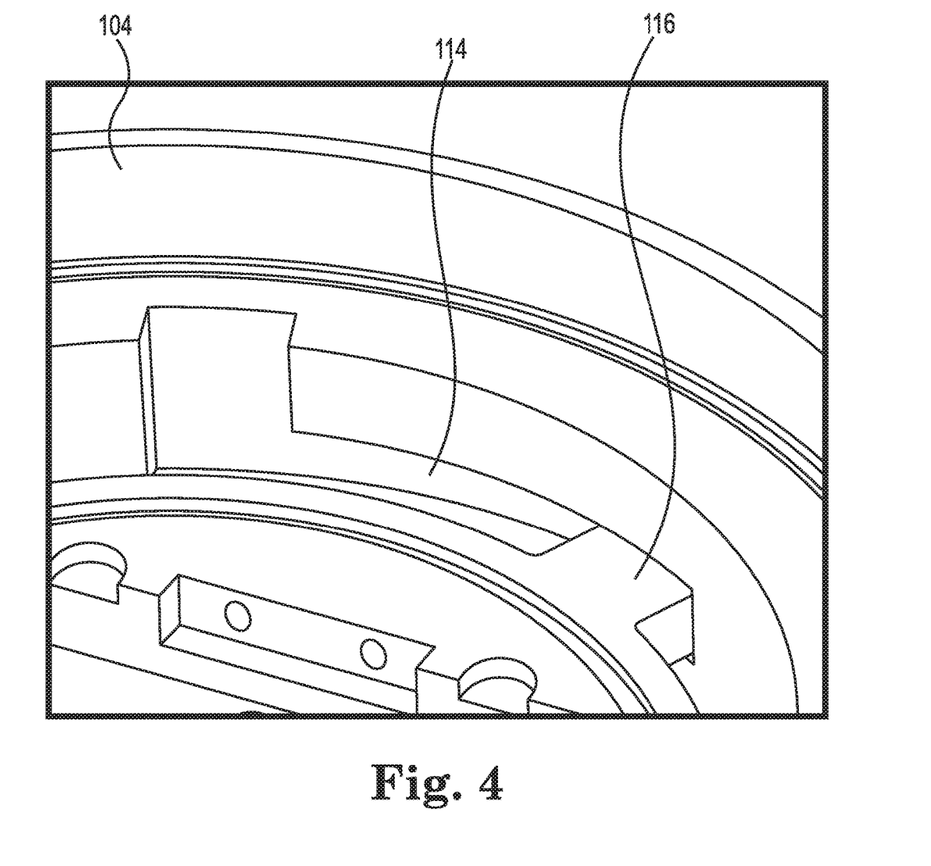
FIG. 4 illustrates a perspective view of a portion of the runway lighting apparatus in accordance with one or more embodiments of the present disclosure.

Referring to FIG. 4, the keys 116 can slide into corresponding slots 114 in the base portion 104. Once the keys 116 are inserted downward through the vertical portion of the slots, the top 102 can be rotated (e.g., using a tool 120, shown in FIG. 5), and the keys 116 can slide through the horizontal portion of the slots 114 until rotation terminates at the end of the slots 114 (as shown in FIG. 4). A distance of the horizontal portion of the slots 114 can be equate to between a 25 and 45 degree rotation of the top portion 102, though embodiments herein are not so limited.

During rotation, the pin 112 in the base 104 can be pressed and held downward by a bottom surface of the top 102. When the keys 116 reach the end of the slots 114, the pin 112 aligns with the pin hole 108 in the top 102 and the spring 118 can force the pin through the pin hole 108 (e.g., through a portion of the pin hole 108). Thus, the top 102 and the base 104 can be secured together such that movement between the two is prevented in all directions.

Figure 5:
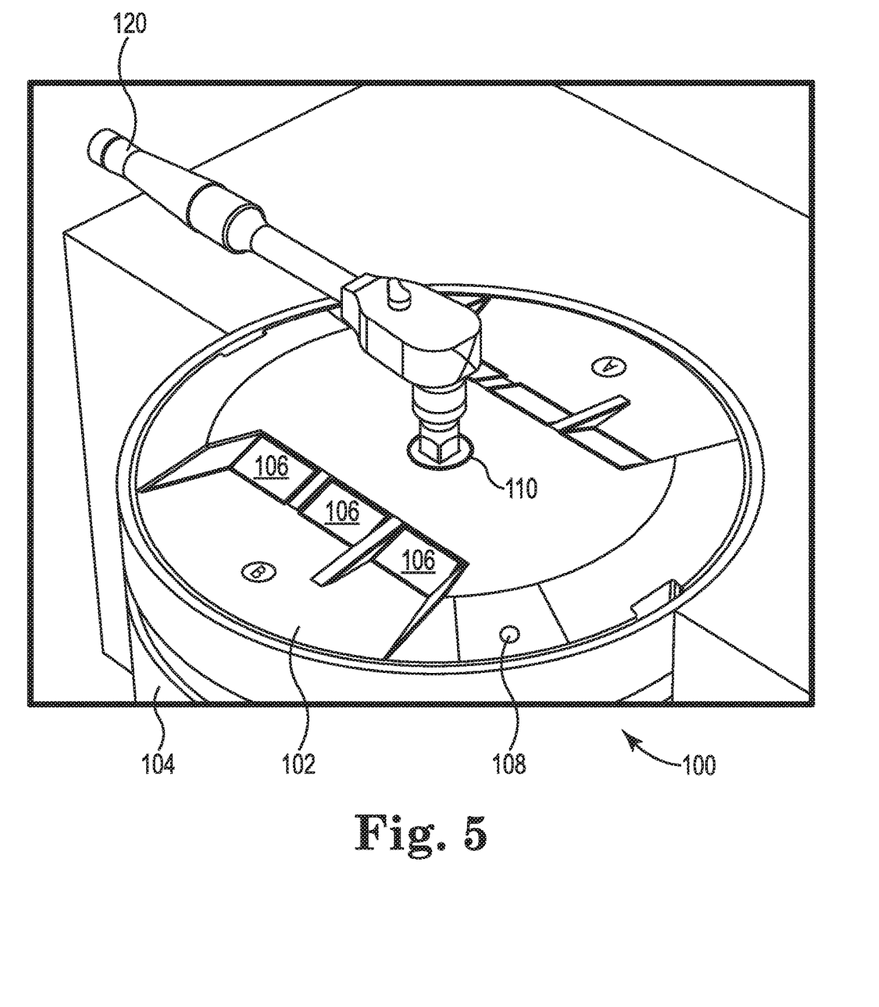
FIG. 5 illustrates a tool being used to manipulate the runway lighting apparatus in accordance with one or more embodiments of the present disclosure.

The top 102 can be removed from the base 104 by depressing the pin 112 through the pin hole 108 (e.g., via an elongate tool) and rotating the top portion in the reverse direction until the pin 112 no longer aligns with the pin hole 108. Further rotation of the top 102 such that the keys 116 slide back through the horizontal portion of the slots 114 into the vertical portion of the slots can be carried out with the aid of a tool 120, for instance. In some embodiments, a screwdriver (e.g., having a diameter of 5 millimeters) can be used to depress the pin 112 and a socket wrench can be used to rotate the top 102, though embodiments herein are not so limited.

In some embodiments, the top 102 can include 2 keys 116 on opposing sides. In some embodiments, the top 102 can include 2 keys, wherein one key 116 is located on a first side and another key 116 is offset 25 degrees from the opposite side. In some embodiments, the base 104 can include two pins 112, and the top can include two corresponding pin holes 108, though it is noted that other quantities of these components are in accordance with embodiments of the present disclosure.

In some embodiments, an O-ring or gasket can be located between a portion of the top 102 and the base 104 to prevent moisture and/or other materials from reaching internal areas of the device 100.

Figure 6:
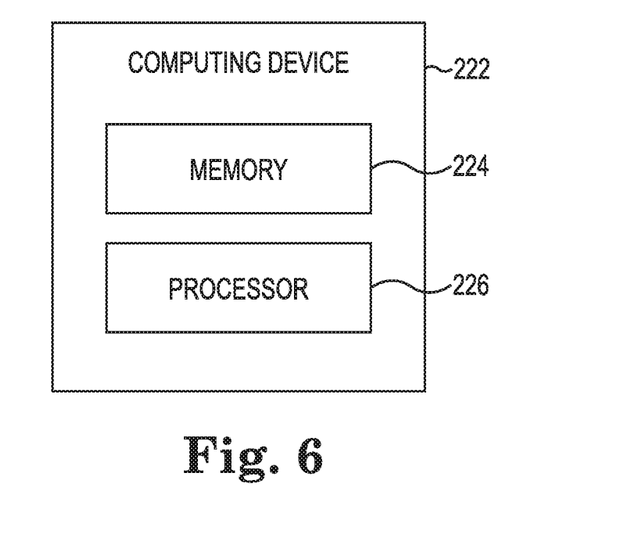
FIG. 6 illustrates a computing device for runway lighting in accordance with one or more embodiments of the present disclosure.

FIG. 6 illustrates a computing device 222 for runway lighting in accordance with one or more embodiments of the present disclosure. Computing device 222 can be, for example, a laptop computer, a desktop computer, or a mobile device (e.g., a mobile phone, a personal digital assistant, etc.), among other types of computing devices. The computing device can be connected to the lighting apparatus 100 via a wired and/or wireless connection.

As shown in FIG. 6, computing device 222 includes a memory 224 and a processor 226 coupled to memory 224. Memory 224 can be any type of storage medium that can be accessed by processor 226 to perform various examples of the present disclosure. For example, memory 224 can be a non-transitory computer readable medium having computer readable instructions (e.g., computer program instructions) stored thereon that are executable by processor 226 to provide runway lighting by controlling a number of operations of the lighting apparatus 100 in accordance with one or more embodiments of the present disclosure.

Memory 224 can be volatile or nonvolatile memory. Memory 224 can also be removable (e.g., portable) memory, or non-removable (e.g., internal) memory. For example, memory 224 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 224 is illustrated as being located in computing device 222, embodiments of the present disclosure are not so limited. For example, memory 224 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A runway lighting apparatus, comprising:
  a top portion, including a plurality of light emitting elements, a plurality of lateral protrusions, and a substantially square-shaped wrench receiver on an exterior surface of the top portion configured to receive a wrench; and
  a base portion including a plurality of surfaces defining a plurality of slots, wherein each of the plurality of slots includes a vertical portion terminating at a respective horizontal portion,
  wherein each slot is configured to receive one of the plurality of lateral protrusions to secure the top portion to the base portion, and wherein a distance of the horizontal portion of each respective slot corresponds to a rotation of the top portion between 25 degrees and 45 degrees to secure the top portion to the base portion.

2. The apparatus of claim 1, wherein the base portion is configured to be secured below a surface of a runway.

3. The apparatus of claim 1, wherein the base portion includes a pin, and wherein the top portion includes a surface defining an opening configured to receive the pin.

4. The apparatus of claim 3, wherein the pin is biased in a raised position by a spring.

5. The apparatus of claim 4, wherein the opening is configured to receive the pin when each of the plurality of lateral protrusions is located at a respective end of a horizontal portion of a respective slot of the plurality of slots.

6. The apparatus of claim 1, wherein the plurality of lateral protrusions comprises a first lateral protrusion directly opposing a second lateral protrusion.

7. The apparatus of claim 1, wherein the plurality of lateral protrusions comprises a first lateral protrusion and a second lateral protrusion that is offset from directly opposing the first lateral protrusion.

8. A method of providing runway lighting, comprising:
   providing a top portion of an apparatus, the top portion including a plurality of light emitting elements and a plurality of lateral protrusions; and
   providing a base portion of the apparatus, the base portion including a plurality of surfaces defining a plurality of slots, wherein each slot is configured to receive one of the plurality of lateral protrusions;
   inserting the top portion into the base portion such that the plurality of lateral protrusions pass downward through vertical portions of the plurality of slots; and
   rotating the top portion, using a wrench partially inserted into a substantially square-shaped wrench receiver on an exterior surface of the top portion, in a first direction between 25 degrees and 45 degrees such that the plurality of lateral protrusions pass through horizontal portions of the plurality of slots until a pin of the base portion passes through an opening of the top portion.

9. The method of claim 8, wherein the method further includes:
   depressing the pin of the base portion such that the pin no longer passes through the opening of the top portion;
   rotating the top portion in a second direction such that the plurality of lateral protrusions pass back through the horizontal portions of the plurality of slots; and
   removing the top portion from the base portion such that the plurality of lateral protrusions pass upward through vertical portions of the plurality of slots.

10. A runway lighting system, comprising:
    a runway lighting apparatus, including:
       a top portion, including a plurality of light emitting elements, a plurality of lateral protrusions, and a substantially square-shaped wrench receiver on an exterior surface of the top portion configured to receive a wrench; and
       a base including a plurality of surfaces defining a plurality of slots, wherein each of the plurality of slots includes a vertical portion terminating at a respective horizontal portion,
       wherein each slot is configured to receive one of the plurality of lateral protrusions to secure the top portion to the base, and wherein a distance of the horizontal portion of each respective slot corresponds to a rotation of the top portion between 25 degrees and 45 degrees to secure the top portion to the base; and
    a computing device connected to the runway lighting apparatus and including:
       a memory; and
       a processor configured to execute executable instructions stored in the memory to control operations of the light emitting elements.

11. The runway lighting system of claim 10, wherein the base includes a securing mechanism configured to engage an opening in the top portion to prevent rotation of the top portion with respect to the base.

12. The runway lighting system of claim 11, wherein the securing mechanism includes a pin protruding from an interior surface of the base.

13. The runway lighting system of claim 10, wherein the base includes a bulbous portion configured to anchor the base in concrete below a surface of the runway.

14. The runway lighting system of claim 13, wherein the top portion, when secured to the base, extends above the surface of the runway to a height not exceeding 6.3 millimeters.

* * * * *